United States Patent

[11] 3,549,013

[72] Inventors Evgeny Ivanovich Zakharov
Malaya Schukinskaya ulitsa 10b, kv. 22;
Susanna Mikhailovna Karpacheva, 2
Schukinskaya proezd, 2, kv. 88, Valerian
Matveevich Muratov, Astakhovsky
pereulok, 1/2, kv. 118; Leonid
Solomonovich Raginsky, Nikitinskaya ulitsa
16, Korpus I kv. 29, Moscow; and Vladimir
Mikandrovich Koshkin, Novomytischinsky
proezd, 26, kv. 12, Mytischi, U.S.S.R.
[21] Appl. No. 740,308
[22] Filed June 26, 1968
[45] Patented Dec. 22, 1970
[32] Priority June 30, 1967
[33] U.S.S.R.
[31] No. 1,167,697

[54] SORPTION TOWER HAVING HORIZONTAL PERFORATED PLATES
6 Claims, 1 Drawing Fig.
[52] U.S. Cl. .................................................. 210/189, 210/19
[51] Int. Cl. .................................................. B01d 15/02
[50] Field of Search ........................................... 210/19, 189

[56] References Cited
UNITED STATES PATENTS
2,742,381  4/1956  Weiss et al. ................... 210/19X
2,932,552  4/1960  Weiss et al. ................... 210/19X
3,307,700  3/1967  De Nevers ................... 210/189X Primary Examiner—J. L. DeCesare
Attorney—Waters, Roditi, Schwartz & Nissen ABSTRACT: A sorption tower has a middle reactive section with horizontal plates for countercurrent flow of sorbent fed at the top of the tower and liquor fed at the bottom of the tower. The liquor is settled in a chamber at the top of the tower and the sorbent in a chamber at the bottom of the tower. The liquor in the vessel is subjected to pulsation. A vessel at the top of the tower is fed with pulp from the sorbent chamber and the pulp is subjected to oscillatory movement to separate sorbent, which is externally discharged from the vessel and tower, from liquor which is returned to the sorbent chamber where it is mixed with sorbent and thereafter recycled to the vessel by means of an ejector.

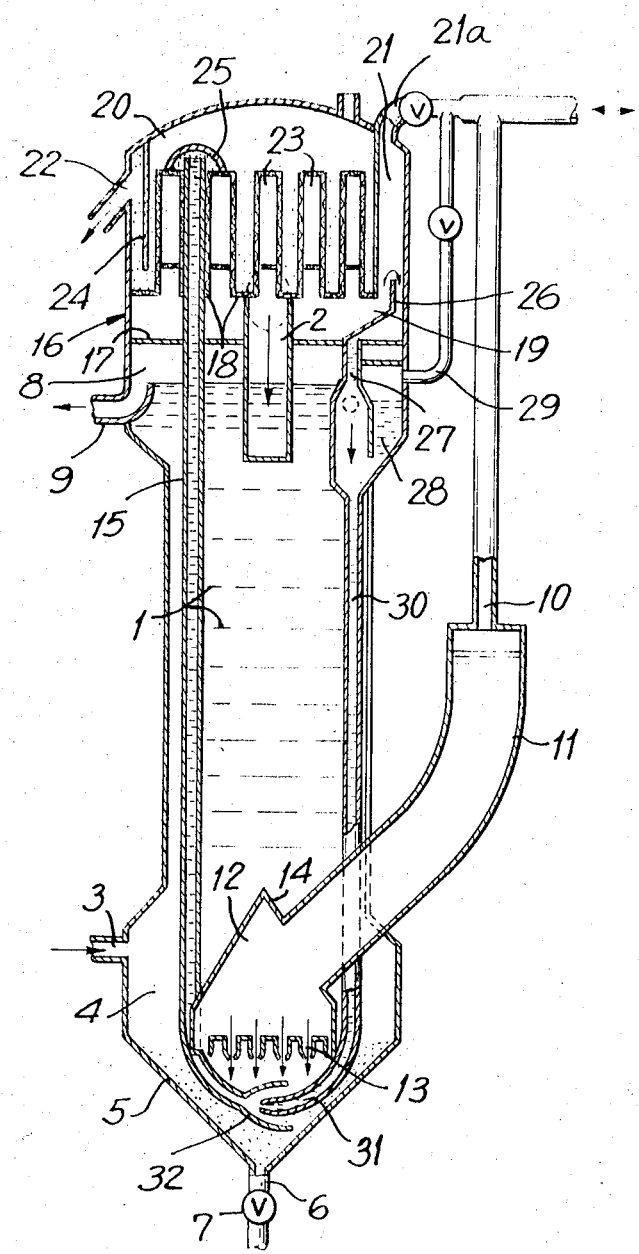

SORPTION TOWER HAVING HORIZONTAL PERFORATED PLATES

This invention relates to sorption towers furnished with horizontally disposed perforated plates and intended for carrying out countercurrent mass transfer processes involving the use of solid sorbents.

The present invention may be employed for obtaining concentrates from mineral waters, for the purification of drinking water and of chemical plant waste effluents, as well as for the recovery and concentration of valuable components in the radiochemical industry and for separating rare-earth elements, etc.

To effect continuous processes in sorption towers, the sorbent and the liquor being processed are caused to flow countercurrently so that the sorbent removes the desired components from the liquor, whereafter the depleted liquor is discharged and the loaded sorbent is subject to regeneration in regenerating towers (units) which are identical in design to the sorption tower. It is, therefore, expedient to dispose the sorption or stripping towers and the regenerating towers in a cascade arrangement.

Sorption (stripping) towers are known in the art (cf. R. McNeill et al., Journal of Metals, 1955, 7, No. 8,912). In the known sorption towers, provision is made in the working zone for horizontal perforated plates fitted with vertical downcomers, while in the top and bottom of the tower there are respectively disposed settling chambers for the liquor and sorbent. Mounted at the base of the tower is a diaphragm pulsated by an appropriate pulse-generating device connected thereto to cause the liquor that fills the tower to oscillate.

The sorbent fed via the tower top forms sorbent beds on the plates and cascades through the downcomers from plate to plate down the tower, whereas the liquor introduced through the tower bottom and flowing up the tower, essentially through the aforesaid downcomers, is pulsated by the diaphragm, thereby lifting (semifluidizing) the sorbent beds off the plates and enhancing the efficiency of the countercurrent process. The sorbent collects in the settling chamber and thereupon is discharged from the tower, freed from the liquor, washed if necessary, and thereafter fed or batched into the next tower (regenerating tower) for carrying out the desorption step.

The known sorption towers have a comparatively small cross-sectional area and, therefore, can be mounted on a relatively small floor space. However, the known sorption towers should be used in conjunction with cumbersome auxiliary equipment intended for transferring the sorbent from one tower to another and also for sorbent batching, which equipment requires substantial floor space for its installation and also necessitates continual monitoring of sorbent transfer processes, since the sorbent tends, when wet, to aggregate and clog the transfer lines.

This tendency of the wet sorbent also adversely affects sorbent batching. A still further disadvantage of the known towers is associated with sorbent attrition during handling and the resultant sorbent entrainment with the liquid phase from the towers.

The aforesaid disadvantages make the sorption process excessively costly, reduce the output and preclude the possibility of carrying out the sorption process continuously because of the sorbent being periodically discharged from and charged in the towers.

Accordingly, it is an object of the present invention to provide an improved sorption tower which makes it possible to separate the sorbent from the liquor and to transfer the sorbent from one column to another without intermediate batching operations.

The present invention contemplates an improved sorption tower having horizontally disposed perforated plates and adapted for carrying out countercurrent mass-transfer processes involving the use of solid sorbents, wherein provision is made for a liquor settling chamber and a sorbent collecting chamber, the bottom of the tower housing a pulsation chamber with a pulsator connected thereto, which pulsator imparts oscillations to the liquor filling the tower.

In accordance with the present invention, the sorbent collecting chamber accommodates a device for agitating the sorbent and the liquor until a pulp is formed which is directed to a vessel fitted with means for sorbent separation from the liquor by causing the pulp contained in the vessel to oscillate, the vessel being connected to the sorbent collecting chamber by means of a pipeline, through which the clarified liquor is recycled. The vessel has a port for discharging the sorbent.

In the preferred embodiment of the present invention, the vessel into which the pulp is fed, is divided by a perforated partition into two compartments, one compartment being coupled to a pulsator, and the other communicating with the sorbent discharge port and having cylindrical filters disposed in openings in the partition for separating the liquor from the sorbent.

A further distinctive feature of the present invention is that the device for agitating the sorbent and the liquor to obtain the pulp comprises a hydraulic headpiece member mounted at the outlet of the pulsating chamber and incorporating a plurality of nozzles directed towards a conical bottom of the sorbent collecting chamber, on one side, and a conical cover directed towards the perforated plates in the tower, on the other side. The liquor issuing from the nozzles intermixes with the sorbent until there forms a pulp that lends itself to transfer to the vessel.

The resultant pulp is conveyed from the sorbent collecting chamber to the vessel by means of an ejector consisting of a pipeline having a bellmouthed end disposed below the headpiece member, said bellmouthed end accommodating the nozzle-type end of the pipeline which recycles the clarified liquor back to the sorbent collecting chamber and is connected to the pulsator pump.

It is expedient to separate the second compartment of the vessel from the sorbent discharge port by a wall which does not reach the perforated partition dividing the vessel into two compartments.

It is likewise expedient to mount a spherical deflector above the outlet end of the pipeline which delivers the pulp to the vessel.

The device according to the present invention is advantageous in that the overall process of discharging the sorbent, separating the liquor therefrom and transferring the sorbent to another tower proceeds within the tower, thereby obviating the necessity of employing auxiliary equipment in the intertower space.

A further advantage of the device according to the present invention stems from the fact that the sorbent in the form of pulp travels upwards in the tower so that clogging of the transportation pipelines is obviated.

A still further advantage of the present invention is that sorbent batching within a cascade of towers is maintained automatically, insofar as sorbent feed to the vessel, where the sorbent is separated from the liquor, depends solely upon the initial sorbent charge into the tower, while sorbent discharge from the separation vessel proceeds continuously as the pulp is supplied to the vessel.

The aforesaid advantages of the present invention, taken in combination, are instrumental in simplifying and reducing the cost of the sorption process, in increasing the efficiency and reliability of the process, the latter factor being of prime importance where the materials being processed exhibit radioactivity or toxicity.

The operating principle of the sorption tower, according to the invention, is described with respect to an exemplary embodiment thereof to be taken in conjunction with the accompanying drawing whose sole figure is a diagrammatic elevation view in section of the sorption tower.

In the sorption tower for carrying out mass-transfer processes involving the use of solid sorbents there are horizontally disposed perforated plates 1 in the middle part of the tower where the reaction takes place. The horizontally disposed perforated plates 1 enhance mass transfer between a sorbent fed through inlet 2 in the top of the tower and the liquor (solution) being processed which is supplied through a connecting pipe 3 in the bottom of the tower and which flows countercurrently to the sorbent stream.

Upon passage through the perforated plates 1 in the reaction zone, the sorbent descends to a collecting chamber 4 having a conical bottom 5 with a discharge line 6 fitted with a shut off valve 7, whereas the liquor travels to settling chamber 8 and thence is discharged via connecting pipe 9.

The mass-transfer process is intensified by imparting oscillations to the liquor that fills the tower, the source of oscillating motion being a pulsator (not shown in the drawing) connected by means of a pipeline 10 to a pulsation chamber 11 disposed in the bottom part of the tower and filled with the same liquor as is in the tower. Mounted at the exit side of pulsation chamber 11 is a head-piece member 12 having a plurality of nozzles 13 facing the bottom 5 of the collecting chamber 4, the headpiece member 12 being closed at the top by a conical cover 14 directed towards plates 1, so that the descending sorbent does not tend to accumulate thereon whereby sorbent flow into collecting chamber 4 is unhindered.

When the liquor contained in pulsation chamber 11 is caused to pulsate, liquor jets issue periodically from nozzles 13 of headpiece member 12 into chamber 4 and intermix the descending sorbent with a liquor in chamber 4 until a desired pulp is obtained.

The pulp is conveyed via a pipeline 15 to a vessel 16 disposed in the upper part of the tower and designed for separating the sorbent from the liquor, bottom 17 of the vessel 16 being located above the liquor level in settling chamber 8 in order to allow the liquor in the tower to oscillate freely.

Vessel 16 is divided by a perforated partition 18 into two compartments 19 and 20 in such a manner that compartment 19 communicates via its pulsation chamber 21 and pipeline 21a with the pulsator (not shown), while compartment 20 communicates with sorbent discharge port 22 and the ambient atmosphere, thereby allowing the pulp contained in compartment 20 to oscillate freely under the effect of pulsations imparted to the clarified liquor in compartment 19.

The sorbent is separated from the liquor by means of cylindrical filters 23 secured in openings of partition 18 and the sorbent is gradually discharged from port 22 due to liquor oscillations in compartment 19. To prevent liquor penetration through sorbent discharge port 22, a wall 24 is provided, which does not reach partition 18 and forms, in conjunction with the partition 18 and the wall of vessel 16, a hydraulic lock. The spherical deflector 25 is disposed above the outlet end of pipeline 15 to eliminate splashing of the pulp fed to vessel 16.

The clarified liquor collects in compartment 19 and flows over partition 26 to a pulsator pump 27, whose pulsation chamber 28 communicates via a pipeline 29 with the pulsator (not shown). Pump 27 is instrumental in conveying the clarified liquor via pipeline 30 to sorbent collecting chamber 4.

Pipeline 30 has a nozzle-shaped end 31 which enters a bellmouthed end 32 of pipeline 15. Bellmouthed end 32 in combination with nozzle-shaped end 31 contained therein form an ejector disposed below hydraulic head-piece member 12 and the ejector is intended for delivering the pulp from chamber 4 to vessel 16 via pipeline 15.

It follows from the foregoing that the process of sorbent transfer from chamber 4 to vessel 16 is accomplished by circulation of the liquor in a closed circuit, an important feature being that pump 27 handles the clarified liquor, so that the mass transfer is unhampered and attrition of the sorbent is avoided.

Although the present invention has been described with reference to a preferred embodiment thereof, various modification and changes can be made without deviating from the spirit and scope of the invention as defined in the appended claims.

We claim:

1. A sorption tower having opposite ends and a middle portion with horizontal perforated plates for carrying out countercurrent mass-transfer processes involving the use of solid sorbents, said tower comprising means for sorbent introduction into said tower at one end thereof; means for liquor supply into said tower at the other end thereof; a liquor settling chamber disposed proximate said one end of said tower; a sorbent collecting chamber disposed proximate said opposite end of said tower; a pulsation chamber in the bottom of said tower for imparting oscillating motion to the liquor which fills said tower; means in said sorbent collecting chamber for mixing the sorbent and the liquor to form a pulp in said sorbent collecting chamber; a vessel connected to said sorbent collecting chamber; means for transferring the pulp from said sorbent collecting chamber to said vessel; means for imparting oscillating motion to the pulp contained in said vessel; means in said vessel for separating the liquor from the sorbent when the pulp contained in said vessel is caused to oscillate; a pipeline connecting said vessel to said sorbent collecting chamber for recycling the liquor clarified in said vessel back to said sorbent collecting chamber; and a sorbent discharge means disposed in said vessel.

2. A sorption tower according to claim 1 comprising a perforated partition in said vessel dividing the vessel into two compartments, one of said compartments being adapted for communicating with a pulsator, while the other compartment communicates with the sorbent discharge means, and cylindrical filters secured in openings of said partition for separation of liquor from the sorbent.

3. A sorption tower according to claim 1 wherein said means for mixing the sorbent and the liquor to form a pulp comprises a hydraulic head-piece member mounted in the pulsation chamber at the exit thereof, said head-piece member including a plurality of nozzles directed into the sorbent collecting chamber and a conical cover directed towards the perforated plates.

4. A sorption tower according to claim 1 comprising an ejector means for transfer of the pulp from the sorbent collecting chamber to the vessel, said ejector means comprising a pipeline having a bellmouthed end disposed below said means for imparting oscillating motion to the pulp, said pipeline which recycles the clarified liquor back to the sorbent collecting chamber including a nozzle end projecting into said bellmouthed end, and a pulsator pump connected to the pipeline with the nozzle end.

5. A sorption tower according to claim 2 comprising a wall in said vessel separating said second compartment from the sorbent discharge means, said wall extending towards but being spaced from said perforated partition.

6. A sorption tower according to claim 4 comprising a spherical deflector disposed above the outlet end of the pipeline feeding the pulp to the vessel.